United States Patent
Kroczek et al.

(10) Patent No.: US 12,078,268 B2
(45) Date of Patent: Sep. 3, 2024

(54) CONNECTOR ASSEMBLY

(71) Applicant: Goodrich Corporation, Charlotte, NC (US)

(72) Inventors: Piotr Kroczek, Dolnośląskie (PL); Agata Kurowska, Kowale (PL); Dariusz Homa, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 55 days.

(21) Appl. No.: 17/826,721

(22) Filed: May 27, 2022

(65) Prior Publication Data

US 2022/0397217 A1 Dec. 15, 2022

(30) Foreign Application Priority Data

Jun. 15, 2021 (EP) .................................... 21461553

(51) Int. Cl.
*F16L 21/00* (2006.01)
*F16L 21/08* (2006.01)
*F16L 41/02* (2006.01)

(52) U.S. Cl.
CPC ............. *F16L 21/002* (2013.01); *F16L 21/08* (2013.01); *F16L 41/021* (2013.01)

(58) Field of Classification Search
CPC ... F16L 19/02; F16L 19/0206; F16L 19/0212; F16L 19/0218; F16L 19/0231; F16L 19/0237; F16L 19/025; F16L 19/06; F16L 19/062; F16L 19/07; F16L 19/075; F16L 21/002; F16L 21/08; F16L 27/08;
(Continued)

(56) References Cited

U.S. PATENT DOCUMENTS

| | | | |
|---|---|---|---|
| 2,781,207 A * | 2/1957 | Detweiler | F16L 27/1274 285/353 |
| 3,438,657 A | 4/1969 | Torres | |
| 3,776,579 A | 12/1973 | Gale | |

(Continued)

FOREIGN PATENT DOCUMENTS

| | | |
|---|---|---|
| DE | 4205153 C1 | 6/1993 |
| EP | 0485885 A1 | 5/1992 |
| EP | 3714745 A1 | 9/2020 |

OTHER PUBLICATIONS

Abstract for DE4205153 (C1), Published: Jun. 24, 1993, 1 page.
(Continued)

*Primary Examiner* — Aaron M Dunwoody
(74) *Attorney, Agent, or Firm* — CANTOR COLBURN LLP

(57) ABSTRACT

A connector assembly includes a first connector part and a second connector part, each connector part defining a fluid flow passage therethrough configured to together define a fluid flow conduit when the first and second parts are connected together. The connector assembly also includes an extension part mounted around one of the first and the second connector parts. The extension part is arranged to move relative to the connector part around which it is mounted to extend across an interface area between the first connector part and the second connector part and to bridge the first and second connector parts when the first and second connector parts are brought to meet each other to define the fluid conduit.

9 Claims, 3 Drawing Sheets

(58) Field of Classification Search
CPC .. F16L 27/0804; F16L 27/113; F16L 27/1133; F16L 27/1136; F16L 41/021; F16L 41/03
See application file for complete search history.

(56) References Cited

U.S. PATENT DOCUMENTS

| | | | |
|---|---|---|---|
| 3,970,337 | A | 7/1976 | Niemeyer |
| 7,455,324 | B2 | 11/2008 | Inoue |
| 9,599,262 | B1 | 3/2017 | Moore |
| 2013/0207383 | A1* | 8/2013 | Sixsmith ............... F16L 39/005 285/123.3 |
| 2017/0059075 | A1* | 3/2017 | Ueno .................... F16K 31/402 |
| 2017/0343141 | A1 | 11/2017 | Roper |

OTHER PUBLICATIONS

Abstract for EP0485885 (A1); Published: May 20, 1992, 1 page.
European Search Report for Application No. 21461553.6, mailed Nov. 9, 2021, 8 pages.

* cited by examiner

CONNECTOR ASSEMBLY

CROSS REFERENCE TO RELATED APPLICATIONS

This application claims priority to European Patent Application No. 21461553.6 filed Jun. 15, 2021, the entire contents of which is incorporated herein by reference.

TECHNICAL FIELD

The present disclosure relates to a connector assembly for connecting components to form a fluid flow conduit.

BACKGROUND

There are many applications where components such as tubes, pipes or connector pieces have to be joined together to form a conduit or passage for the flow of fluid such as water, gas, fuel, oil etc. The components have to be connected in a fluid tight manner to prevent leakage and must be securely fastened. In many cases, it is also necessary that the fastening be releasable to allow the connected components to be disconnected. Connector parts may be secured together by a form fit or friction fit and provided with seals around the join to prevent leakage. Often connector parts are connected by pushing one connector part into the other and then securing the connection by means of a clamp around the outside of the area where the connector parts join.

One example of where connector parts need to be combined to form a flow conduit is where a flow valve is used in a system. The valve is provided to regulate the flow of fluid through the pipes of the system and is therefore provided in the flow path(s). A valve will generally have one or more connector parts defining fluid inlets to, and fluid outlets from the valve. These are arranged to be fluidly connected to the fluid flow lines of the system in which the valve is used so that when the valve is open, a flow passage or conduit is defined from a system line, through an inlet defined by a valve connector part, through the valve, through an outlet defined by a connector part of the valve and into a system line connected to the outlet.

In a water system, for example, water may be provided from a supply to a tank via a valve and/or from the tank to an end user or as overflow via a valve. The valve needs to be securely and fluidly connected by connector parts to the lines from the supply, to the tank and from the tank to the end user/overflow. The connection between the valve and the lines must be fluid-tight to prevent leakage.

For certain applications, e.g. (but not only) in aircraft water systems, there are specific industry/safety/quality requirements dictating the type of clamps that must be used to secure a connection between two connector parts. Conventionally for such systems, a first connector part is designed to have a slightly smaller diameter than the opposite connector part such that the smaller connector part can be pushed into the larger connector part. Seals, e.g. O-ring seals, may be provided in the area inside the larger connector part, or on the outside of the smaller connector part, where the two parts overlap to ensure a tight fight. A clamp is then secured around the overlapping area to ensure a secure connection.

In some applications, however, the connections are provided in constrained areas or are limited by the shape and configuration of the system part, such that it is not easy, or sometimes not possible, to connect the connector parts by pushing one into the other and it is then not possible to secure the clamp around a push-fit connection as required. For example, valves have recently been designed having several ports around the valve that need to be connected to cooperating connector parts at different angles e.g. at e.g. 90 degree separation. It is not possible to connect all ports at the same time by the push-fit connection conventionally used.

There is, therefore, a need for a connector assembly that enables a secure, fluid-tight connection of two connector parts even in such constrained spaces, and that allows the connection to be secured by a clamp as required.

SUMMARY

According to the present disclosure, there is provided a connector assembly comprising: a first connector part and a second connector part, each connector part defining a fluid flow passage therethrough configured to together define a fluid flow conduit when the first and second parts are connected together, the connector assembly further comprising an extension part mounted around one of the first and the second connector parts, the extension part arranged to move relative to the connector part around which it is mounted to extend across an interface area between the first connector part and the second connector part and to bridge the first and second connector parts when the first and second connector parts are brought to meet each other to define the fluid conduit.

The extension part may be a sleeve arranged to slide relative to the connector part around which it is mounted to overlap the other of the first and second connector parts.

Sealing means may be provided on an outer surface of one or both of the first and second connector parts to provide a seal between the connector part(s) and the extension part.

The interface area preferably includes a gap between the first and second connector parts, and may be defined by the first and second connector parts abutting against each other.

The first connector part and/or the second connector part may be provided with means for engaging a fluid port of a fluid system component, in use.

A clamp may be provided, configured to be mounted over the extension part when the first and second connector parts together define the fluid conduit.

Also provided is a fluid system such as a water system, comprising a valve arranged in a fluid flow path to regulate the flow of fluid therethrough, the valve connected to the fluid flow path by means of a connector assembly as defined above.

The valve may have a plurality of ports to be connected to fluid lines of the system, and comprising a corresponding plurality of such connector assemblies to connect the ports to the fluid lines.

Also provided is a method of connecting a first connector part to a second connector part to define a fluid flow conduit therethrough, the method comprising aligning the first and second connector parts with each other such that a fluid flow passage through the first connector part is aligned with a fluid flow passage through a second connector part, moving a movable extension part mounted around one of the first and second connector parts such that it extends over the other of the first and second connector parts across an interface are between the first and second connector parts such that the fluid flow passages of the connector parts together define the fluid flow conduit.

BRIEF DESCRIPTION OF THE FIGURES

Preferred embodiments will now be described by way of example only. Most of the description relates to the use of the connector assembly used for connecting a valve in a fluid system, but the connector assembly of the disclosure is advantageous in many other applications where two connector parts need to be connected to define a conduit therebetween.

DETAILED DESCRIPTION

Figure 1:
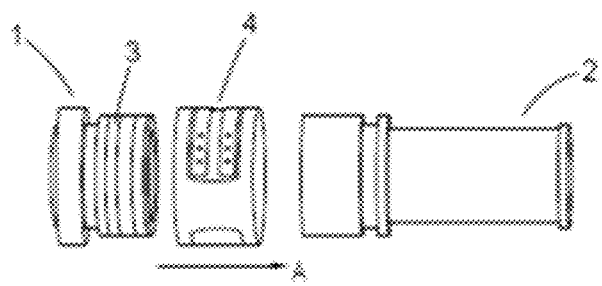
FIG. 1 shows a convention connector assembly by way of background explanation.

Referring first to FIG. 1, a conventional connector will be briefly described. A connector assembly comprises a first connector part 1, which may, for example, be a connector piece of a valve 10, and a connector part 2, which may be, for example, a connector piece of a tank 20, where the valve 10 is provided in a fluid path to regulate flow of fluid to and/or from the tank 20. To connect the valve 10 into the fluid path it is, therefore, necessary to connect the first and second connector parts 1, 2 together to define a fluid flow conduit. Conventionally, one of the connector parts (here the first connector part 1) has a smaller diameter than the other connector part 2. The parts are connected by pushing the first connector part 1 into the second connector part 2 as indicated by arrow A. A secure, sealing connection can be ensured by means of sealing rings 3 provided on the outer surface of the first connector part 1 (and/or the inner surface of the second connector part 2 (not shown here). The two parts are then secured together by means of a clamp 4 that is fastened around the connectors where the parts overlap.

Figure 2:
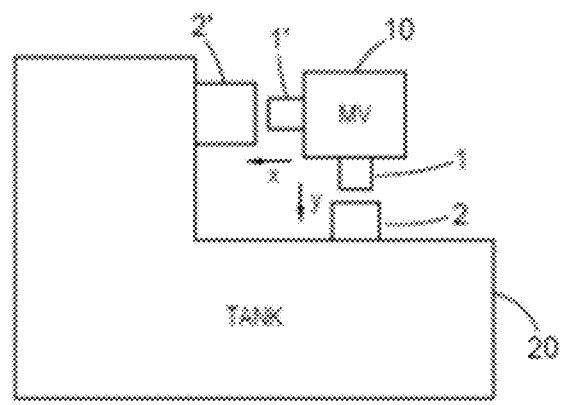
FIG. 2 shows a water system to which a valve is to be connected to regulate the flow of fluid in the system.

In some applications, such as shown in FIG. 2, where the valve has several ports or connectors 1, 1' to be connected to respective connector parts 2, 2', it is not possible to secure the valve in place using the push-fit connection described above. If one set of connector parts 1, 2 is connected by push fitting, then another set 1',2' will no longer be properly aligned to push together. In other words, in the example shown in FIG. 2, it is not possible to push connector part 1, 1 into connector parts 2, 2' at the same time, since the valve cannot be pushed in directions X and Y simultaneously. Similar problems may arise in other situations where connector parts have to be connected in constrained spaces or configurations.

Figure 3:
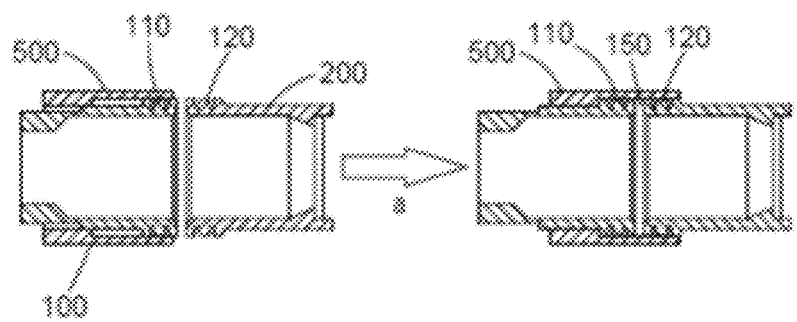
FIG. 3 shows an example of a connector assembly according to this disclosure.

The connector assembly of the present disclosure overcomes this problem by providing an adjustable length connector part as will be described with reference to FIGS. 3 to 5.

The connector assembly comprises a first connector part 100 and a second connector part 200. In the example described below, the second connector part 200 is attached to the valve 300 and the first connector part 100 is attached to the tank 400 but the reverse could also be used. Also, the connection between a valve and a tank is just one possible application for use of the connector assembly of the disclosure.

One of the connector parts—here the first connector part 100—is provided with an extension sleeve 500 that is slidably mounted over the end portion of the connector part 100 that is to cooperate with the second connector part 200. The sleeve 500 is configured such that when the first and second connector parts 100,200 are brought together and meet each other the sleeve 500 can then be slid axially relative to the connector part 100 on which it is mounted (here in the direction of arrow a) across the interface 150 where the two connector parts meet to extend over an end portion of the other connector part across the interface 150 thus forming a bridge between the two connector parts. To ensure a fluid-tight seal between the sleeve and the connector parts, sealing rings 110, 120 may be provided on the outer surface of one or both connector parts where the sleeve 500 overlaps the connector parts.

A small gap may be left between the end surfaces of the connector parts when the sleeve is in place to allow some tolerance, but this is not essential and the assembly may be designed such that the two connector parts do contact each other.

In this way, the sleeve 500 acts as an extension of the length of one of the connector parts to allow the parts to be securely connected to each other without the need to push one into the other.

The way in which the parts are connected will be explained further with reference to FIGS. 4A to 4D.

Figure 4A:
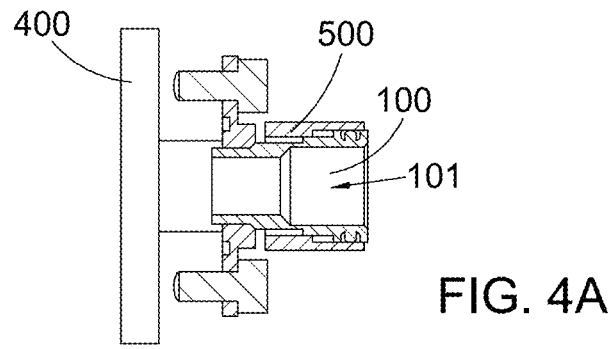
FIGS. 4A to 4D show an example of how a connector assembly according to this disclosure may be used.

A first connector piece 100 is provided on a first part to be connected into the fluid flow path (here tank 400) (FIG. 4A). The ways in which a connector can be attached to a system part are well known and will not be described further here. In one example, the attachment is a threaded attachment 700. The connector part 100 defines a fluid flow channel 101. A sleeve 500 is mounted over the connector part 100.

A system part (here valve 300) to be connected into the fluid flow path is provided with a second connector part 200 at a port 301 of the valve. In the example shown, the valve 300 has four ports 301, 302, 303 and 304 each of which is to be connected to another system part by means of a connector assembly connecting the valve connector to an opposing connector of another system part. Here, we only describe making a connection between one of the valve connector parts 200 and an opposing connector part 100, but the same principle applies to the other valve connectors at the other ports.

The valve shown here is just one example and its structure and operation is not limiting on the connector assembly of this disclosure and so will not be described further.

Figure 4B:
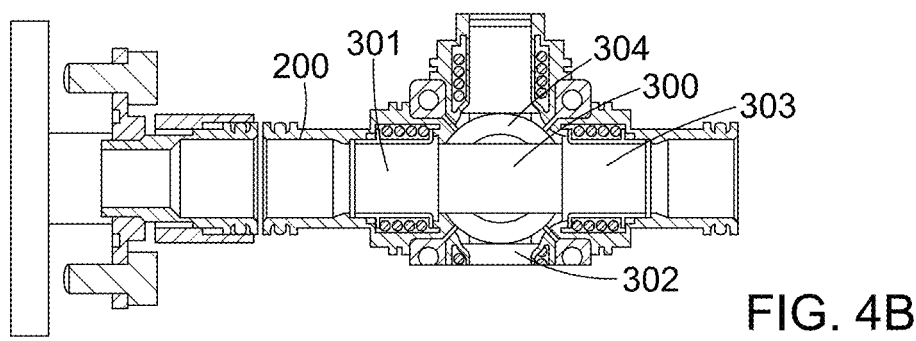
Figure 4C:
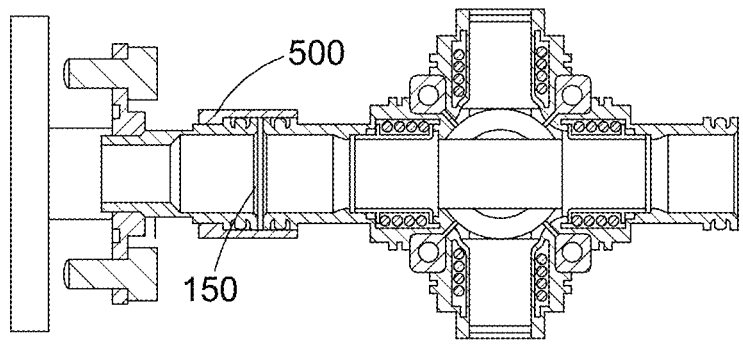
Figure 4D:
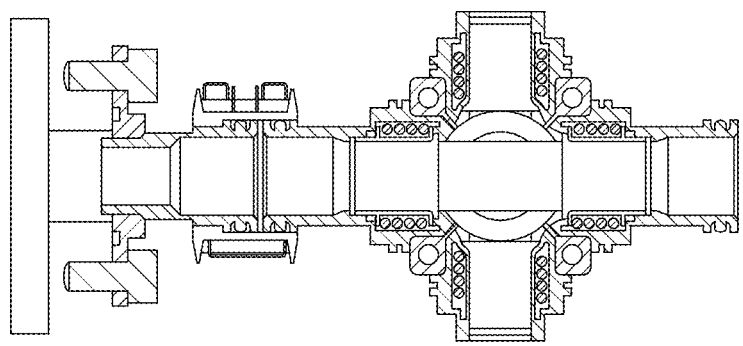

As shown in FIG. 4B, the valve is brought into position such that its ports and their connector parts 200 align with the corresponding opposite connector parts 100. Once the first and second connector parts abut (FIG. 4C), the sleeve 500 is slid axially across the interface 150 where they meet and over the end of the second connector part 200 thus bridging the first and second connector parts. The same procedure can be carried out at the other ports.

The connection is then secured by fitting a clamp 4, which may be a standard clamp known in the art, over the sleeve 500.

Figure 5:
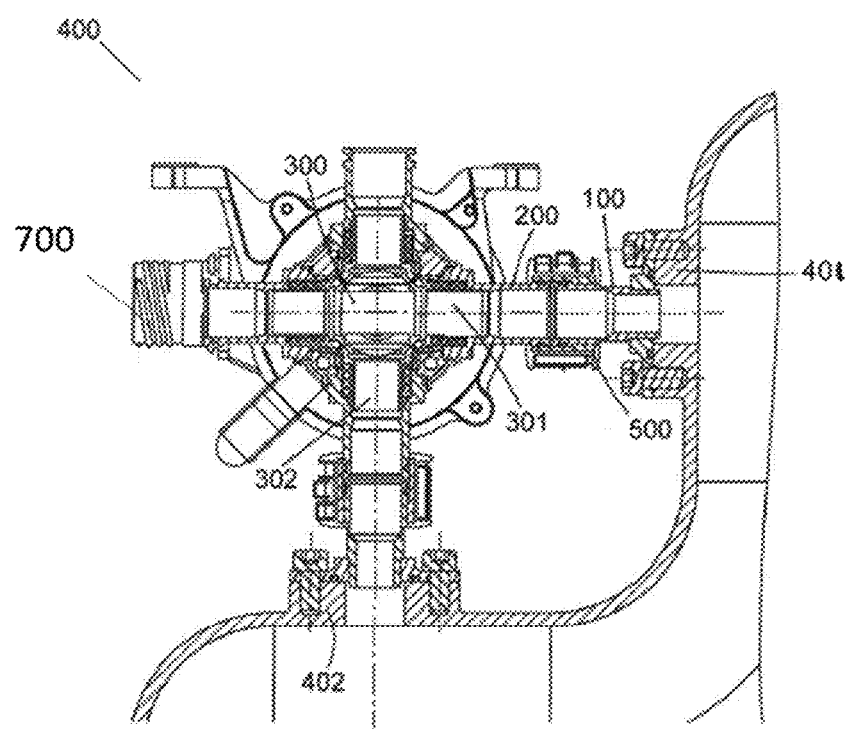
FIG. 5 shows an example of a system using a connector assembly according to the disclosure.

FIG. 5 shows the connector assembly of this disclosure used to connect two ports 301, 302 of a valve 300 to two respective ports 401, 402 of a tank, where the ports are at about 90 degrees from each other. Of course, the connector assembly can be advantageous in other connections and arrangements.

The use of the moving sleeve ensures that such a valve assembly or other structure can be properly mounted to other parts of a fluid flow system. The sleeve allows for some movement of the engaging parts and builds some tolerance into the connection. The sleeve is simple and no special tools are required for its use and assembly and allows the use of a known clamp for securement of the connection.

The invention claimed is:

1. A fluid system comprising:
   a valve arranged in a fluid flow path to regulate the flow of fluid therethrough;
   a connector assembly that connects the valve connected to the fluid flow path, wherein the connector assembly includes:
      a first connector part;
      a second connector part;
      wherein each of the first and second connector parts define a fluid flow passage therethrough configured to together define a fluid flow conduit when the first and second parts are connected together, and
      an extension part mounted around one of the first and the second connector parts, the extension part arranged to move relative to the connector part around which the extension part is mounted to extend across an interface area between the first connector part and the second connector part and to bridge the first and second connector parts when the first and second connector parts are brought to meet each other to define the fluid conduit;
   wherein the system is a water system having a water tank connected to the valve via one or more fluid lines.

2. A fluid system of claim 1, wherein the extension part is a sleeve arranged to slide relative to the connector part around which the extension part is mounted to overlap the other of the first and second connector parts.

3. A fluid system of claim 1, wherein the connector assembly further comprises: claim 1, further comprising:
   sealing means provided on an outer surface of one or both of the first and second connector parts to provide a seal between the connector part(s) and the extension part.

4. A fluid system of claim 1, wherein the interface area includes a gap between the first and second connector parts.

5. A fluid system of claim 1, wherein the interface area is defined by the first and second connector parts abutting against each other.

6. A fluid system of claim 1, wherein the first connector part or the second connector part is provided with means for engaging a fluid port of a fluid system component, in use.

7. A connector assembly as claimed in claim 6, where the means for engaging comprises a thread.

8. A fluid system of claim 1, wherein the connector assembly further comprises:
   a clamp configured to be mounted over the extension part when the first and second connector parts together define the fluid conduit.

9. A fluid system as claimed in claim 1, where the valve has a plurality of ports to be connected to fluid lines of the system, and comprising a corresponding plurality of such connector assemblies to connect the ports to the fluid lines.

* * * * *